(12) United States Patent
Lessard et al.

(10) Patent No.: US 9,274,915 B2
(45) Date of Patent: Mar. 1, 2016

(54) SIDEBAND LOGIC FOR MONITORING PCIE HEADERS

(71) Applicant: LSI CORPORATION, San Jose, CA (US)

(72) Inventors: Brian Lessard, Milpitas, CA (US); Robert E. Ward, Colorado Springs, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 94 days.

(21) Appl. No.: 14/280,906

(22) Filed: May 19, 2014

(65) Prior Publication Data

US 2015/0331773 A1    Nov. 19, 2015

(51) Int. Cl.
*G06F 11/00* (2006.01)
*G06F 11/30* (2006.01)
*G06F 13/24* (2006.01)
*G06F 13/42* (2006.01)

(52) U.S. Cl.
CPC ............ *G06F 11/3027* (2013.01); *G06F 13/24* (2013.01); *G06F 13/423* (2013.01)

(58) Field of Classification Search
USPC .......................................................... 714/56
See application file for complete search history.

(56) References Cited

U.S. PATENT DOCUMENTS

2011/0096880 A1* 4/2011 Steinbusch ................ H04L 7/02
                                                              375/354
2013/0339778 A1* 12/2013 Smentek ................. G06F 13/42
                                                              713/600

* cited by examiner

*Primary Examiner* — Sarai Butler

(57) ABSTRACT

Disclosed is a system and method for monitoring PCIe packets between clock domains. An interrupt is set to a root complex or external hardware based on the detection of malformed, and illegal, packets.

9 Claims, 2 Drawing Sheets

The first DW of the TLP header

SIDEBAND LOGIC FOR MONITORING PCIE HEADERS

FIELD OF THE INVENTION

The field of the invention relates generally to Peripheral Component Interconnect Express.

BACKGROUND OF THE INVENTION

PCI Express (Peripheral Component Interconnect Express), often abbreviated as PCIe, is a high-speed serial computer expansion bus standard. PCIe has high maximum system bus throughput, low I/O pin count and small physical footprint. PCIe has good performance-scaling for bus devices with a detailed error detection and reporting mechanism (Advanced Error Reporting (AER)). The PCIe electrical interface is used in a variety of other standards, such as ExpressCard, a laptop expansion card interface.

PCIe is generally based on point-to-point topology, with separate serial links connecting every device to the root complex (host). A PCIe bus link supports full-duplex communication between any two endpoints, with no inherent limitation on concurrent access across multiple endpoints.

PCIe communication is encapsulated in packets. The processes of packetizing and de-packetizing data and status-message traffic are handled by a transaction layer of the PCIe port.

SUMMARY OF THE INVENTION

An embodiment of the invention may therefore comprise a method of monitoring packets in a system comprising a first clock domain and a second clock domain, wherein the first clock domain receives input from external hardware and the second clock domain provides output to an endpoint, the method comprising monitoring Peripheral Component Interconnect Express packets at a clock domain crossing between the first clock domain and the second clock domain, decoding headers of the packets, and signaling an interrupt to external hardware based on the decoded header.

An embodiment of the invention may further comprise a system for monitoring packets between clock domains, the system comprising a first clock domain that receives input from external hardware, a second clock domain that provides output to an endpoint, and a Peripheral Component Interconnect Express header monitor, wherein the header monitor receives Peripheral Component Interconnect Express packets from the first clock domain, decodes headers of the packets and signals interrupts to external hardware based on the decoded headers.

DETAILED DESCRIPTION OF THE EMBODIMENTS

In PCIe, packets are received in a transaction layer. A PCIe is generally a serial interface in different link widths. In some cases, PCIe has a 32-bit bus and packets arrive on the bus. In such a case, packet lengths are multiples of 32-bits. As an example, a packet may indicate "write data 0x1234 at address 0xABCD". It is understood that PCIe may utilize other than a 32-bit bus. In embodiments of the invention, a 128-bit packet interface is used within PCIe devices. A packet may also indicate "read from address 0xABCD (and return a response packet)". As is understood by those skilled in the art, there are many types of packets. Packet types may include memory read, memory write, I\O read, I/O write, message, completion, and so on. The transaction layer generally is tasked with accepting packets and issuing packets. Packets are generally presented in a specific format called "transaction layer packets" (TLPs). Each 32-bit data that arrives on a bus is termed a "double word" (DW).

In PCIe, a root complex device connects a processor and memory subsystem to the PCIe switch fabric composed of one or more switch devices. The root complex generates transaction requests on behalf of the processor, which is interconnected through a local bus. Root complex functionality may be implemented as a discrete device, or may be integrated with the processor. A root complex may contain more than one PCIe port and multiple switch devices can be connected to ports on the root complex or cascaded.

A Base Address Register (BAR) describes a region in PCIe configuration space. In order to address a PCI device it must be mapped into the I/O port address space or the memory-mapped address space of the system. The system's firmware/device drivers or the operating system will program the BARs to inform the device of its address mapping by writing configuration commands to the PCI controller.

Figure 1:
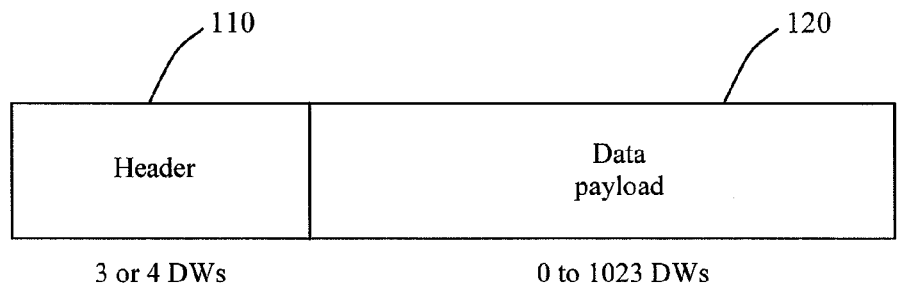
FIG. 1 shows the layout of a transaction layer packet.

FIG. 1 shows the layout of a transaction layer packet. The packet 100 comprises a header 110 and a data payload 120. The header 110 may comprise 3 or 4 DWs.

Figure 2:
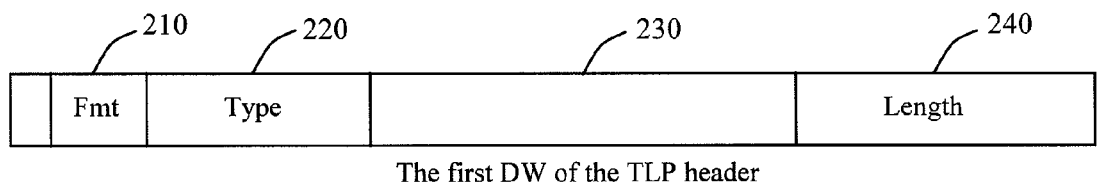
FIG. 2 shows the first DW of a transaction layer packet header.

FIG. 2 shows the first DW of a transaction layer packet header. A transaction layer packet header 200 comprises a format field 210, a type field 220, a first DW of the transaction layer packet header field 230 and a length field. The format field 210 indicates the length of the header and if a data payload is present. The format field 210 can indicate a 3 DW header with no data, a 4 DW header with no data, a 3 DW header with data, and a 4 DW header with data. Together with the type field 220, the transaction layer packet 100 operation is defined. The remainder of the header content will depend on the operation of the transaction layer packet.

As PCIe packets flow, there is a chance that those packets could be formed improperly. These improperly formed packets may be referred to as malformed packets. The term malformed packets is used throughout this description to include illegally formed packets. Illegally formed packets may include packets formed in violation PCIe standards and usages. Malformed packets may result in improper headers or other problems with the packets and the exchange of data in a system. Data corruption may result.

Figure 3:
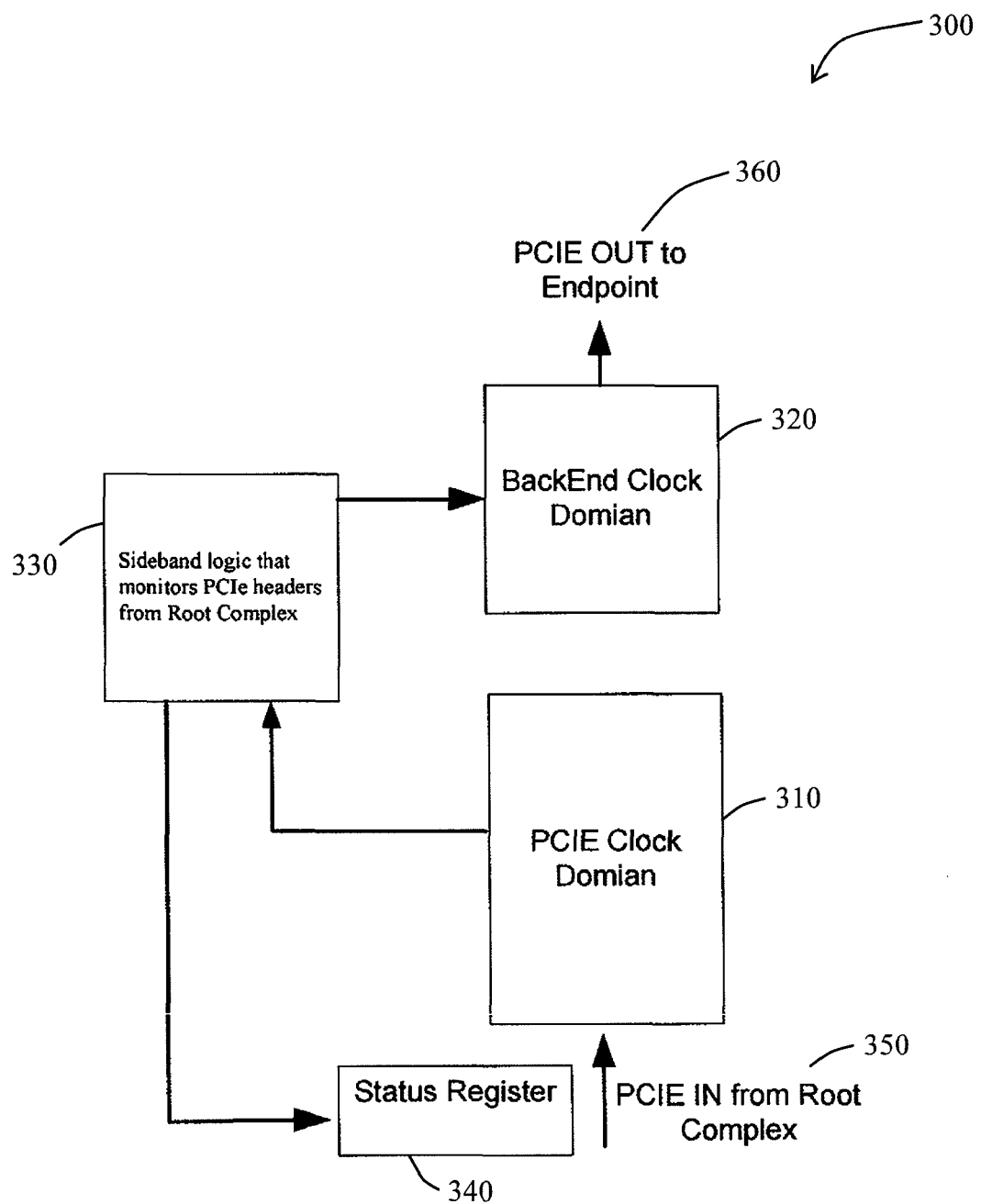
FIG. 3 shows sideband logic for monitoring PCIe headers from a Root Complex.

FIG. 3 shows sideband for monitoring PCIe header from root complexes. The system 300 comprises a PCIe clock domain 310, a backend clock domain 320, a sideband logic unit 330 and a status register 340. A PCIe input 350 is received at the PCIe clock domain 310. A PCIe output 360 is issued to an endpoint by the backend clock domain 320.

The sideband logic unit 330 receives inputs from the PCI clock domain 310 before transmitting those inputs to the backend clock domain 320. A clock domain crossing (CDC) is the traversal of a signal in asynchronous digital circuit from one clock domain into another. Accordingly, the sideband logic performs the clock domain crossing operation to synchronize signals. The CDC is inside the sideband logic 330 which allows for synchronization. Different clock domains have clocks which have a different frequency, a different phase (due to either differing clock latency or a different clock source), or both. Either way the relationship between the clock edges in the two domains cannot be relied upon.

Synchronizing a single bit signal to a clock domain with a higher frequency can be accomplished by registering the signal through a pair flip-flop that is clocked by the source domain, thus holding the signal long enough to be detected by the higher frequency clocked destination domain.

Packets 350 that flow into the system 300 may potentially be formed improperly. Improper formation of packets may cause data corruption. The packets in the system 300 may be being processed and may not be flagged in a slower core before any resultant data corruption occurs. Embodiments of the invention also monitor the following: Completion with No Data, Poison Packets, Illegal Packets—MemRd or MemWr packets that do not hit a BAR. Packets travelling from the PCIe clock domain 310 to the backend clock domain 320 are essentially intercepted and screened for any improperly formed packets. Because this interception occurs before, or at, the CDC, any potential data corruption is mitigated before any mishandling can occur in the backend clock domain 320. An intended endpoint device to which the packet would be sent 360 by the backend clock domain 320 is shielded from data corruption by improper decoding of a mal formed data, or illegal, packet. A status register 340 captures the entire header, stores the packet type (illegal, poisoned, malformed, Completion with No Data) and interrupt status

[The sideband logic 330 determines that a header may be corrupted. A look-up table may be used. The look-up table may comprise the acceptable header values that are supported in the device. The incoming packet header may be compared to the look-up table to determine the status of the packet. The look-up table may be updateable to accept changes to the acceptable headers.

The sideband logic device 330 monitors bus activity in the fastest domain and masks any malformed, and illegal, packets from the endpoint device. An interrupt will be set by the sideband logic 330 to the root complex, or other appropriate hardware or application. Those skilled in the art will understand other appropriate hardware or applications that are suitable targets for an interrupt. The sideband logic device 330 will set error bits for the debugging of any bad packets that are detected.

As noted, the sideband logic 330 will set error bits for a debug based upon the detection of any malformed, and illegal, packets. In the processing, the sideband logic will decode the header of a packet and signal an interrupt based upon a plurality of occurrences. These occurrences may comprise if the packet is corrupted as explained herein—including the absence of expected data (completion with no data), and targeting a base address register (BAR) that is not valid for a memory read (MemRd) or memory write (MemWr) operation. The sideband logic operations may also comprise capturing a header and transfers the information into readable registers in interrupt conditions, synchronized all information between the PCIe clock domain 310 and the backend clock domain 320. Synchronization is achieved by combination dual-stage flip-flops and custom edge-detection synchronization logic. For instance, the PCIe clock domain 310 may be 250 MHz and the backend clock domain, which may be that of a CPU, may be 125 MHz. The capture logic may be controlled to trigger if a packet is ignored or to capture a new header. This is in essence a debug mode for firmware in the device. For debug purposes, the registers may be enabled to capture the most recent "legal" packet for examination.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of monitoring packets in a system comprising a first clock domain and a second clock domain, wherein said first clock domain receives input from external hardware and said second clock domain provides output to an endpoint, said method comprising:
   monitoring Peripheral Component Interconnect Express packets at a clock domain crossing between said first clock domain and said second clock domain;
   decoding headers of said packets; and
   signaling an interrupt to external hardware based on said decoded header.

2. The method of claim 1, wherein said process of monitoring Peripheral Component Interconnect Express packets comprises monitoring Peripheral Component Interconnect Express packets with sideband logic.

3. The method of claim 1, said method further comprising transmitting a status of said monitoring process to a status register.

4. The method of claim 1, said method further comprising:
   monitoring bus activity in the faster of said first clock domain and said second clock domain; and
   masking malformed packets from said endpoint.

5. The method of claim 1, wherein said external hardware is a root complex.

6. A system for monitoring packets between clock domains, said system comprising:
   a first clock domain that receives input from external hardware;
   a second clock domain that provides output to an endpoint; and
   a Peripheral Component Interconnect Express header monitor;
   wherein said header monitor receives Peripheral Component Interconnect Express packets from said first clock domain, decodes headers of said packets and signals interrupts to external hardware based on said decoded headers.

7. The system of claim 6, wherein said system further comprises a status register connected to said header monitor.

8. The system of claim 6, wherein said header monitor further monitors bus activity in the faster of said first clock domain and said second clock domain and masks malformed packets from said endpoint.

9. The system of claim 6, wherein said external hardware is a root complex.

* * * * *